United States Patent
Reissfelder et al.

(10) Patent No.: US 7,426,575 B1
(45) Date of Patent: Sep. 16, 2008

(54) DISCARD POLICY METHOD AND APPARATUS

(75) Inventors: Bob Reissfelder, Westwood, MA (US); Yantao Jia, Stow, MA (US); Lei Jin, Irvine, CA (US); Shahzad Ali, Rohnert Park, CA (US); Stephen John West, Petaluma, CA (US); Hui Zhang, Santa Rosa, CA (US); Shuangxia Sarah Zhu, Rohnert Park, CA (US)

(73) Assignee: Turin Networks, Petaluma, CA (US)

( * ) Notice: Subject to any disclaimer, the term of this patent is extended or adjusted under 35 U.S.C. 154(b) by 901 days.

(21) Appl. No.: 09/859,192

(22) Filed: May 14, 2001

(51) Int. Cl.
*G06F 15/173* (2006.01)
*G06F 15/16* (2006.01)
(52) U.S. Cl. ................ 709/240; 709/231; 709/238
(58) Field of Classification Search ......... 709/209, 709/219, 223, 225, 227, 229, 230–232, 238, 709/240
See application file for complete search history.

(56) References Cited

U.S. PATENT DOCUMENTS

| | | | |
|---|---|---|---|
| 6,252,848 B1 * | 6/2001 | Skirmont | 370/229 |
| 6,442,165 B1 * | 8/2002 | Sitaraman et al. | 370/395.4 |
| 6,636,481 B1 * | 10/2003 | Yamaguchi et al. | 370/230 |
| 6,643,260 B1 * | 11/2003 | Kloth et al. | 370/235 |
| 6,856,596 B2 * | 2/2005 | Blumer et al. | 370/230 |
| 6,904,015 B1 * | 6/2005 | Chen et al. | 370/235 |
| 6,917,585 B1 * | 7/2005 | Firoiu et al. | 370/229 |
| 6,950,656 B1 * | 9/2005 | Bahk et al. | 455/436 |

OTHER PUBLICATIONS

Nick McKeown, Martin Izzard Adisak Mekkittikul, William Ellersick, Mark Horowitz, "The Tiny Tera: A Packet Switch Core", Dept. of electrical Enginerring & Computer Science, Stanford University, Stanford, CA 94305-4070, DSP R&D Center, Corporate Research & Development, Texas Instruments, Incorp., PO Box 655474, MS446, Dallas, TX 75265.

* cited by examiner

*Primary Examiner*—Ario Etienne
*Assistant Examiner*—Hussein A El Chanti
(74) *Attorney, Agent, or Firm*—Blakely, Sokoloff, Taylor & Zafman LLP

(57) ABSTRACT

An arriving cell is admitted when a flow occupancy level is less than a flow minimum threshold. When the flow occupancy level is not less than the flow minimum threshold, a drop probability based on per-class thresholds is applied to determine if the arriving is to be rejected. When the arriving cell is not to be rejected after applying the drop probability based on the per-class thresholds, a drop probability based on per-flow thresholds is applied.

21 Claims, 5 Drawing Sheets

DISCARD POLICY METHOD AND APPARATUS

FIELD OF THE INVENTION

The present invention relates generally to field of data switching. More specifically, the present invention is directed to dropping packets during transmission.

BACKGROUND

The desire to integrate data, voice, image, video and other traffic over high speed digital trunks has led to the requirement for faster networks including the capability to route more information faster from one node to another node. A switch performs this routing of information. Generally, the switch consists of three logical portions: ports, a switch fabric and a scheduler.

Routing and buffering functions are two major functions performed by a switch fabric. New packets arriving at an ingress are transferred by the scheduler across the switch fabric to an egress. The ingress refers to a side of the switch which receives arriving packets (or incoming traffic). The egress refers to a side of the switch which sends the packets out from the switch.

Most of the switches today are implemented using a centralized crossbar approach. FIG. 1 is an exemplary illustration of a centralized crossbar switch. The packets arrive at the centralized crossbar switch 100 at multiple ingress ports 105 on the ingress 102. They are transferred across the switch fabric 110 to multiple egress ports 115 on the egress 104 and then sent out to an output link (not shown). The centralized crossbar switch 100 can transfer packets between multiple ingress port-to-egress port connections simultaneously.

A centralized scheduler controls the transfer of the packets from the ingress ports 105 to the egress ports 115. Every packet that arrives at the ingress ports 105 has to be registered in the centralized scheduler. Each packet then waits for a decision by the centralized scheduler directing it to be transferred through the switch fabric 110. With fixed size packets, all the transmissions through the switch fabric 110 are synchronized.

Each packet belongs to a flow, which carries data belonging to an application. A flow may have multiple packets. There may be multiple flows arriving at the ingress ports 105 at the same time. Since the packets in these multiple flows may be transferred to the same egress port, each of these packets waits for its turn in ingress buffers (not shown) in the ingress 102.

The centralized scheduler examines the packets in the ingress buffers and chooses a set of conflict-free connections among the appropriate ingress ports 105 and egress ports 115 based upon the configuration of the switch fabric 110. One of the egress ports 115 may receive packets from one or more ingress ports 105. However, at any one time, the centralized scheduler ensures that each ingress port is connected to at most one egress port, and that each egress port is connected to at most one ingress port.

Each packet transferred across the switch fabric 110 by the centralized scheduler waits in egress buffers (not shown) in the egress 104 to be selected by the centralized scheduler for transmission out of the switch. The centralized scheduler places the selected packets in the appropriate egress ports 115 to have the packets transmitted out to an output link.

The centralized scheduler may not be able to transfer packets from the ingress 102 across the switch fabric 110 at a same pace that new packets arrive at the ingress ports 105. Ingress buffers are used to store the new packets when there is available space. When the ingress buffers overflow, congestion occurs at the ingress ports 105. The ingress buffers are part of an input queue. When there is no packet dropping policy, all arriving packets are dropped regardless of properties of the packets (e.g., packet size, etc.).

Generally, the packet dropping policies are designed to provide fairness to network applications, among others factors (e.g., increase network utilization, etc.). Depending on the type of technology, fairness may be implemented differently. For example, ATM (asynchronous transfer mode) networks can support multiple traffic types (e.g., voice, data, video traffic, etc.), and applications associated with these traffic types may behave differently (e.g., burst data, etc.).

There are different packet dropping policies available, and each may implement a different fairness criteria (e.g., packet size, traffic type, etc.). For example, in a "drop tail" (DT) packet dropping policy in ATM technology, all arriving cells in a packet are dropped when the ingress buffers are full. That is, packets from applications having high priority (e.g., video applications) are dropped similar to packets from applications having low priority (e.g., electronic mail applications). The DT packet dropping policy is not practical because it treats packets from different traffic types the same.

FIG. 2 is an exemplary graph illustrating a random early detection (RED) packet dropping policy. RED is one approach to solving the queue overflow problem by randomly dropping cells using thresholds. Using RED, an occupancy level of the input queue is monitored. The occupancy level indicates how much space of the input queue is occupied. This occupancy level is compared to pre-set thresholds such that dropping decision can be made. RED is random because the cells are randomly dropped using a probability. Using RED, cells are dropped early before the input queue overflows.

Referring to FIG. 2, the vertical axis 200 represents a probability for an arriving cell to be dropped. When the probability is 1, all arriving cells are dropped. The horizontal axis 202 represents an average occupancy level or an average queue length. A minimum buffer occupancy threshold 205 represents a value below which all cells arriving at the input queue are admitted into the buffer. A maximum buffer occupancy threshold 210 represents a value above which all cells arriving at the input queue are dropped. The area between the minimum occupancy threshold 205 and the maximum occupancy threshold 210 represents an increasing level of drop probability. For example, at an average queue length 207, there is a 30% probability that cells arriving at the input queue are discarded. However, at an average queue length 209, there is a 90% probability that cells arriving at the input queue are discarded. As the average queue length increases (i.e., the input queue becomes more filled), the probability of dropping arriving cells increases. When a maximum threshold 210 is reached (i.e., high occupancy level), the probability of dropping arriving cells is 1. The average queue length in the RED packet dropping policy is based on an aggregate occupancy of all flows, and as such, only one minimum threshold and one maximum threshold is necessary. Thus RED provides some level of fairness by using random dropping based on occupancy thresholds and drop probability.

FIG. 3 is an exemplary chart illustrating a RIO (RED with in and out profiles) packet dropping policy. The RIO packet dropping policy is a variation of the RED packet dropping policy having multiple profiles 305 and 310. The RIO packet dropping policy also operates with a packet dropping probability and thresholds. The profile 305 causes cells to be dropped at a lower minimum threshold 315 than the profile 310 having a minimum threshold 320. The profile 305 has a lower maximum threshold 325 than the profile 310 having a maximum threshold 330.

Packet dropping decisions using the DT policy, the RED policy and the RIO policy are based on buffer occupancy. There is no flow consideration since these policies provide no mechanism to identify or distinguish flows. This does not provide adequate fairness because packet-dropping decisions made based on occupancy level may allow some flow to get more than its fair share of the input queue than others. For example, a high bandwidth application may exhaust space in the input queue preventing a low bandwidth application from occupying any space in the input queue. The DT, RED and RIO packet dropping policies cannot be used to support quality of service (QoS) guarantees because there is no mechanism to isolate different classes of traffic. QoS specifies a guaranteed throughput level such that a time it takes for a packet to travel from a source location to a destination location will not exceed a specified level.

What is needed is a packet dropping policy that provides fairness based on flow isolation and traffic type or class isolation.

SUMMARY OF THE INVENTION

An arriving cell is admitted when a flow occupancy level is less than a flow minimum threshold. When the flow occupancy level is not less than the flow minimum threshold, a drop probability based on per-class thresholds is applied to determine if the arriving cell is to be rejected. When the arriving cell is not to be rejected after applying the drop probability based on the per-class thresholds, a drop probability based on per-flow thresholds is applied.

Other objects, features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
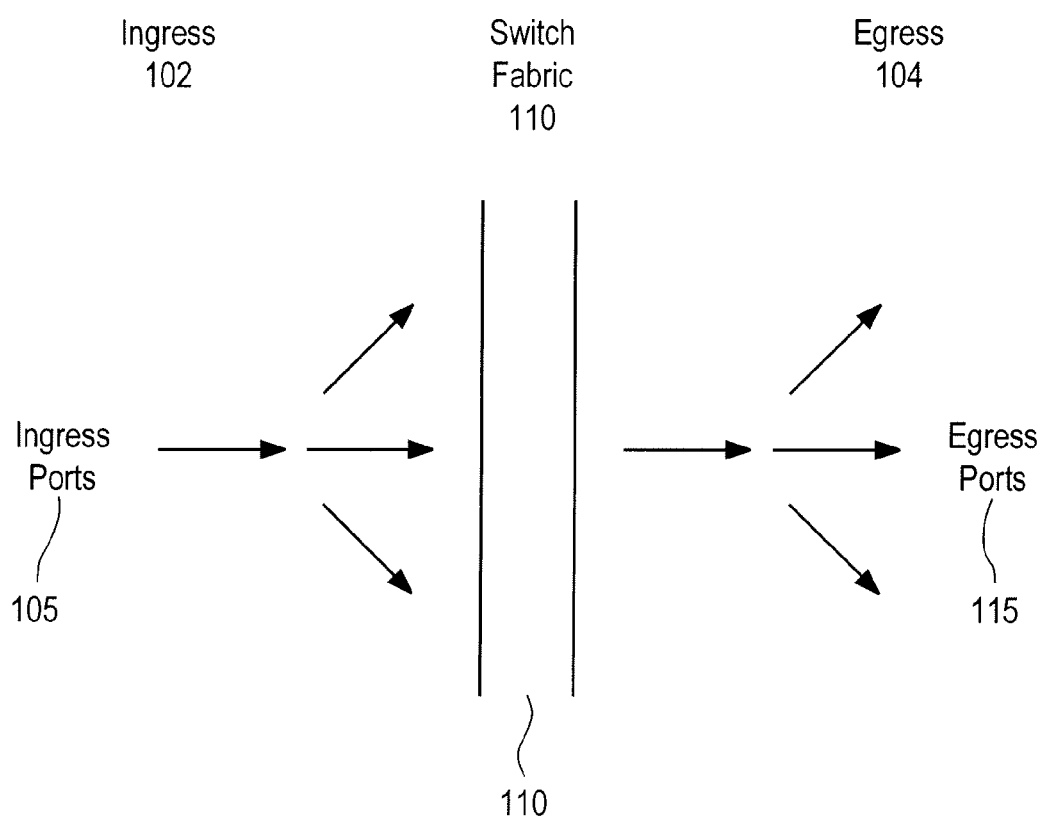
FIG. 1 is an exemplary diagram of a centralized crossbar switch.

A method and apparatus for packet dropping is disclosed. In one embodiment, the method employs a packet dropping policy that supports flow isolation for flows associated with multiple traffic classes. Each traffic class is associated with a profile having a minimum threshold occupancy level and a maximum threshold occupancy level in a queue. These two thresholds are used to determine when packets are dropped. Each flow has a minimum flow threshold to allow the flow to occupy space in the queue.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to system for performing the operations herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the required method processes. The required structure for a variety of these systems will appear from the description below. In addition, the present invention is not described with reference to any particular programming language. It will be appreciated that a variety of programming languages may be used to implement the teachings of the invention as described herein.

Overview

Referring to FIG. 1, cells arriving at the ingress ports 105 are stored in an input queue (not shown). Each cell may belong to a packet. For example, when IP (Internet protocol) traffic is transported over an ATM network, IP packets are fragmented into cells, and the cells are later reassembled into packets by an ATM adaptation layer (AAL). Each arriving cell then waits in the input queue until it is selected by a scheduler (not shown) to be transferred across the switch fabric 110. Similarly, cells leaving the switch fabric 110 are placed in an output queue (not shown) and wait until selected by the scheduler to be transmitted to an output link (not shown). Each of the input queue and the output queue may consist of multiple buffers. When cells arrive faster than they can be selected from the input queue or from the output queue, congestion and overflow occur. When this happens, it may be necessary to discard or drop arriving cells.

Figure 3:
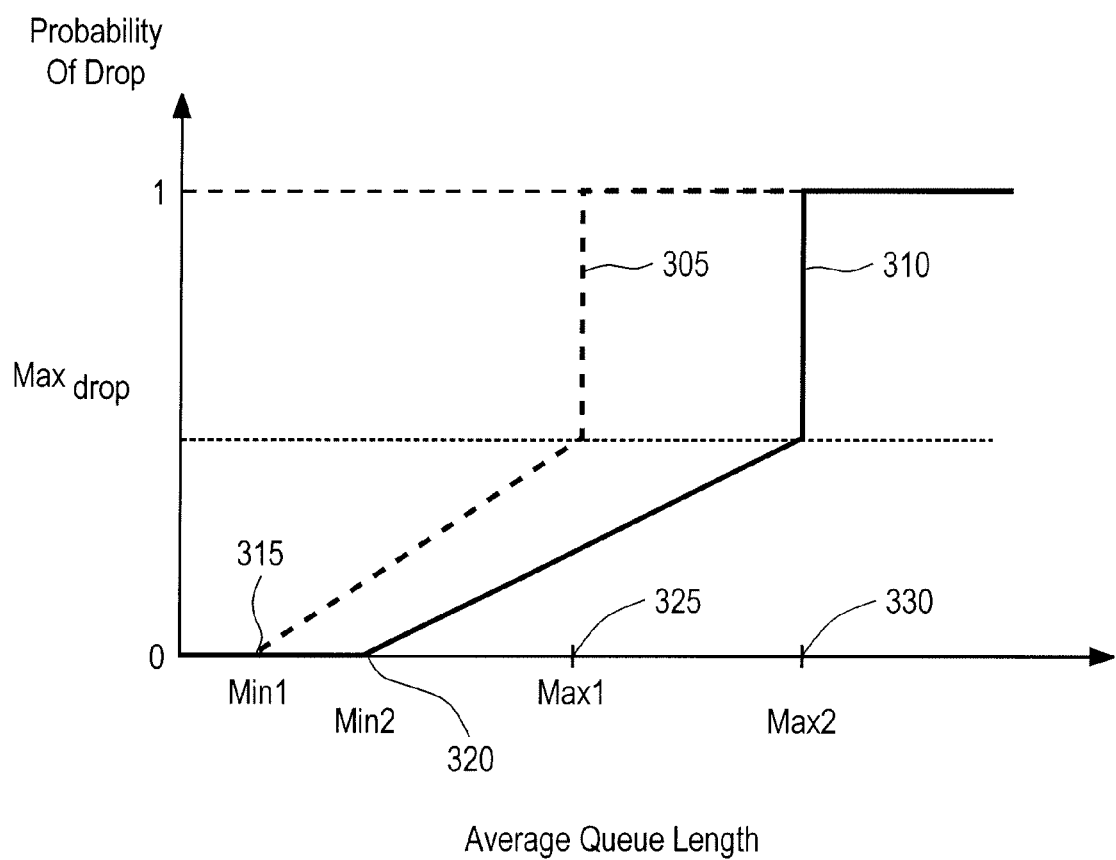
FIG. 3 is an exemplary chart illustrating a RIO (RED with in and out profiles) packet dropping policy.

In one embodiment, each of the RIO profiles in FIG. 3 may represent a class of traffic. For example, using the RIO packet dropping policy, a class of traffic associated with the profile 310 has a higher priority than a class of traffic associated with the profile 305. Accordingly packet dropping is less likely to occur for packets associated with the profile 310. Within each class of traffic, there may be multiple flows.

Figure 4:
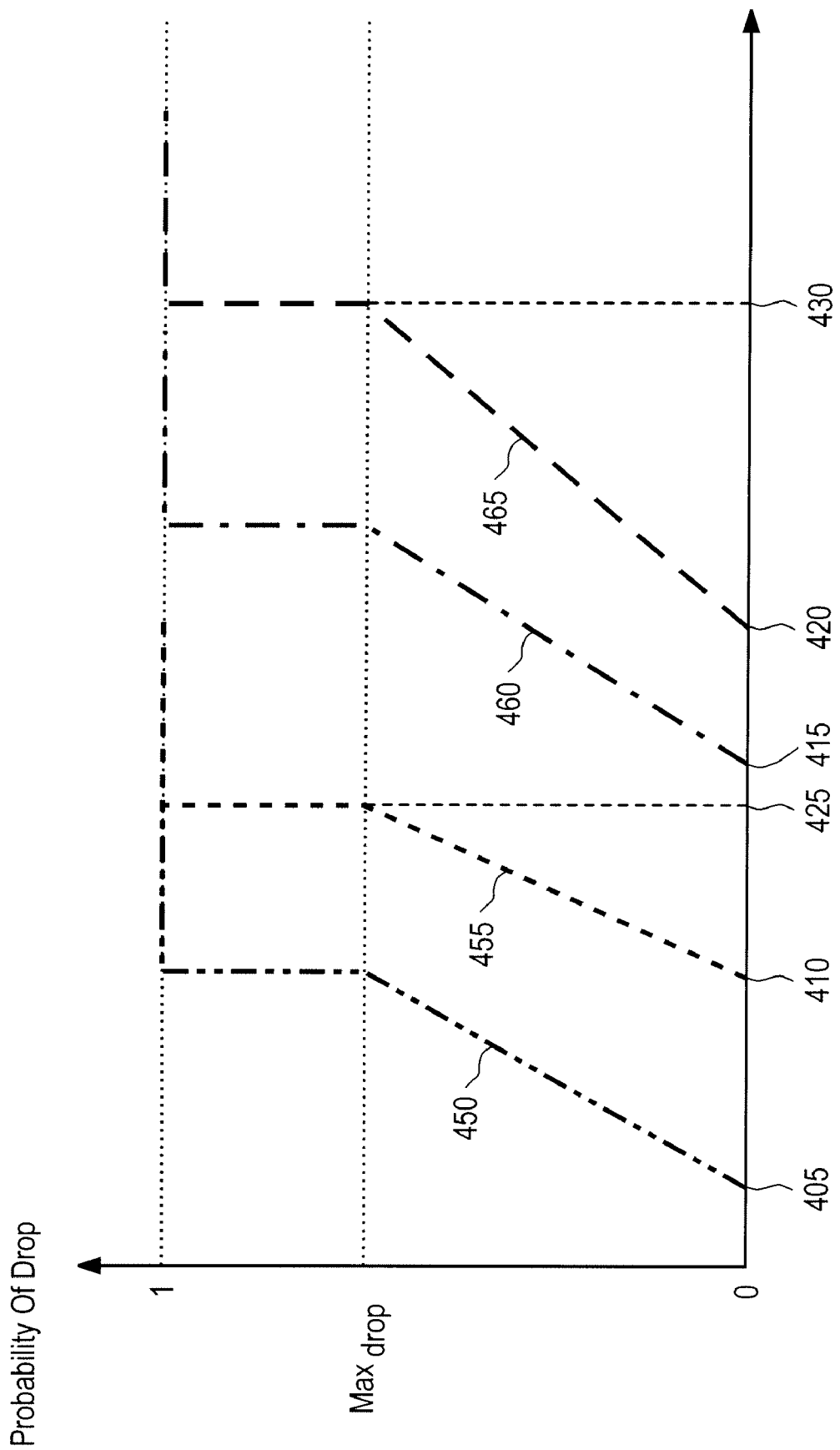
FIG. 4 is an exemplary chart illustrating multiple profiles using the RIO packet dropping policy.

FIG. 4 is an exemplary chart illustrating multiple profiles using the RIO packet dropping policy. Referring to FIG. 4, there are four profiles 450-465, each with its own minimum threshold and maximum threshold. For example, the first profile 450 has a lowest minimum threshold 405, and the second profile has a next higher minimum threshold 410, etc. Arriving cells from flows associated with a class of traffic represented by the fourth profile 465 are least likely to be dropped. Similarly, arriving cells from flows associated with a class of traffic represented by the first profile 450 are more likely to be dropped.

The maximum thresholds of the profiles 450-465 illustrated in FIG. 4 follow the same increasing order. For example, the maximum threshold 430 of the fourth profile 465 is higher than the maximum threshold 425 of the second profile 455, etc. In this example, arriving cells from flows associated with a class of traffic represented by the fourth profile 465 would be accepted into the input queue if an average occupancy level of that class of traffic (or average class occupancy level) in the input queue is below the minimum threshold 420 (class minimum threshold). Similarly, the arriving cells would be dropped if the average class occupancy level is above the maximum threshold 430 (class maximum threshold). The class minimum threshold and the class maximum threshold are collectively referred to as per-class thresholds.

Each of the multiple profiles illustrated in FIG. 4 represents a class of traffic and is referred to herein as a class profile. The class profile allows for class of traffic isolation. However, within each class of traffic, there is still a lack of flow isolation. That is, within each class of traffic, a flow may prevent another flow from occupying any space in the input queue.

Figure 2:
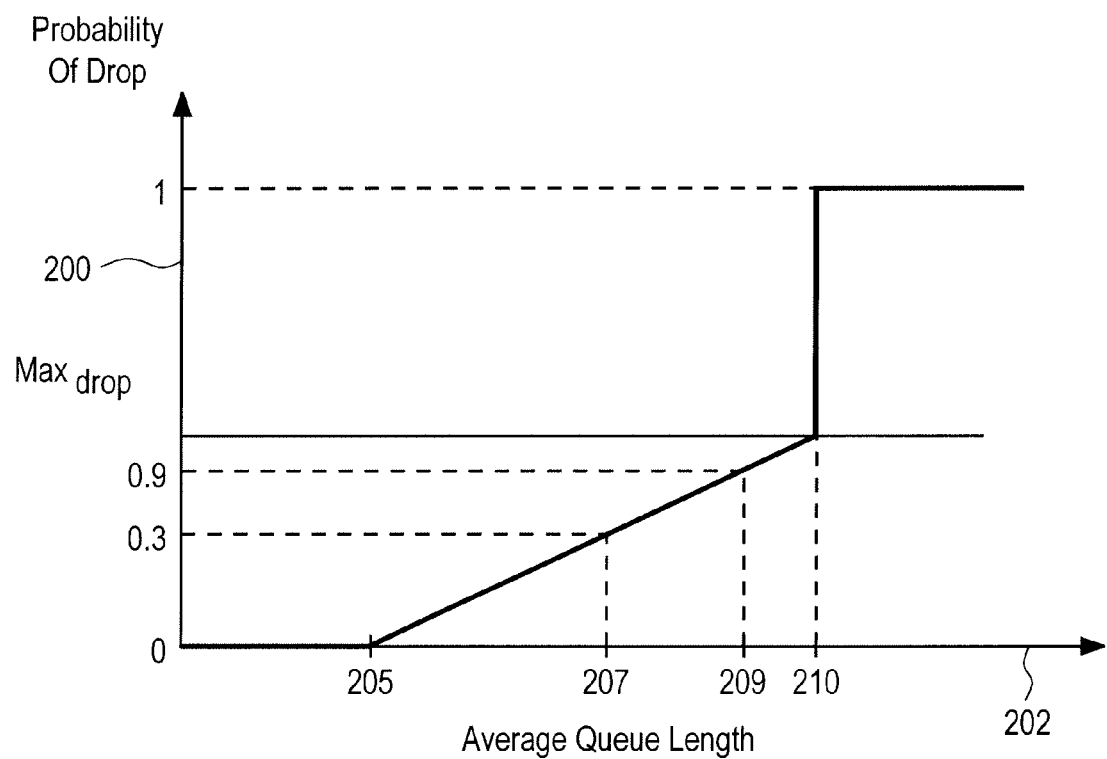
FIG. 2 is an exemplary graph illustrating a random early detection (RED) packet dropping policy.

In one embodiment, each of the flows within each class of traffic has a flow profile. The flow profile includes a flow minimum threshold and a flow maximum threshold. These thresholds allow a flow to occupy space in the input queue at least up to the flow minimum threshold. In one embodiment, arriving cells from a flow associated with a class of traffic will be given space in the input queue when the average occupancy level for that flow is below the flow minimum threshold. For example, when the average occupancy level for the flow associated with the profile in FIG. 2 is below the flow minimum threshold 205, arriving cells from that flow are accepted into the input queue. This allows a flow to get as much space in the input queue as it needs until the flow minimum threshold is reached. When the occupancy level is beyond the flow minimum threshold, an appropriate drop probability is applied.

Figure 5:
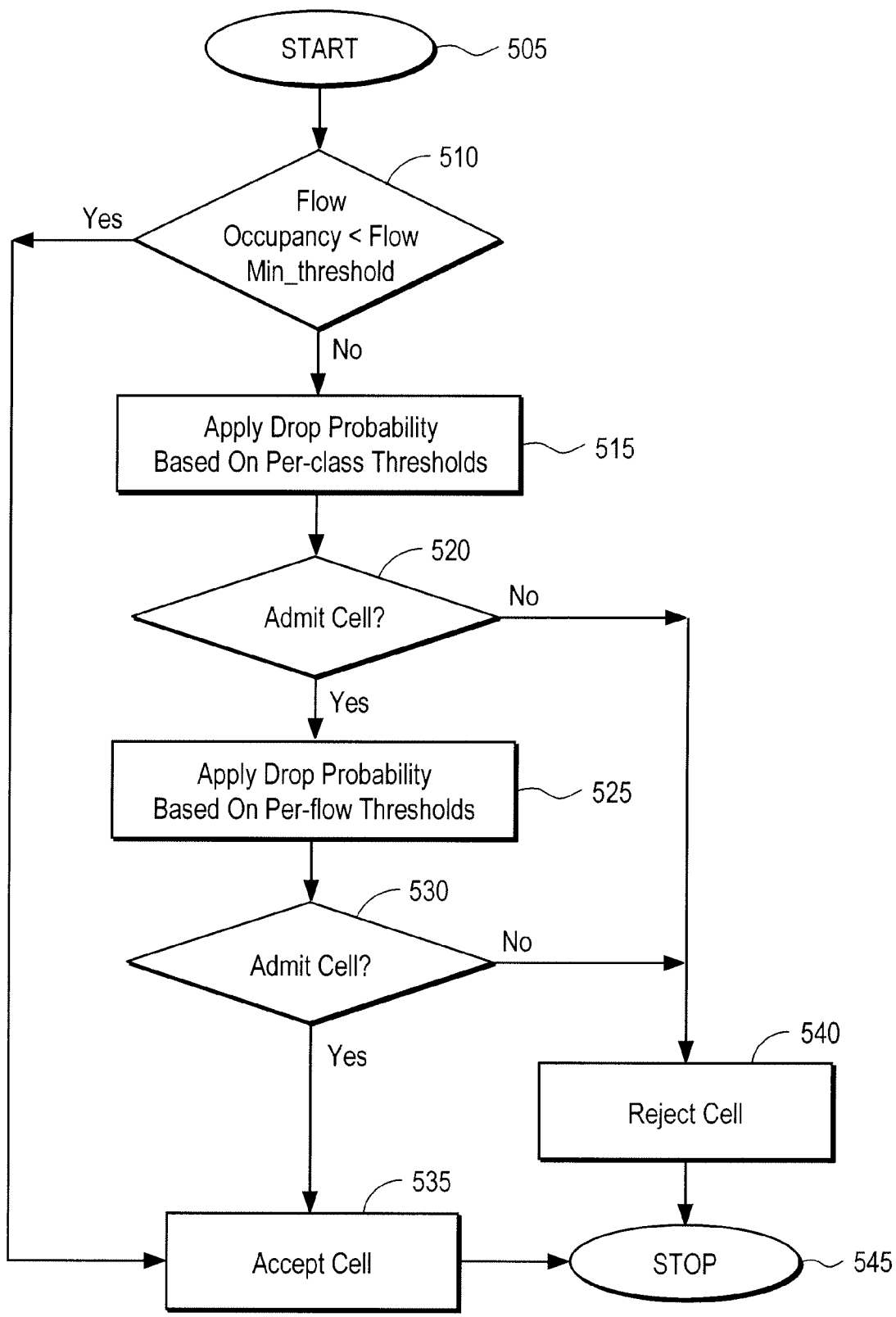
FIG. 5 is a flow diagram illustrating one embodiment of a packet dropping process.

FIG. 5 is a flow diagram illustrating one embodiment of a packet dropping process. The process is performed with processing logic that may comprise hardware (e.g., circuitry, dedicated logic, etc.), software (such as is run on a general purpose computer system or a dedicated machine), or a combination of both. As described herein, each flow is associated with a class of traffic, and each class of traffic is represented by a RED profile having a class minimum threshold and a class maximum threshold.

The process starts at processing block 505. The packet dropping process is performed when a new cell arrives. For example, the new cell may belong to a flow associated with a class of traffic represented by the fourth profile 465 illustrated in FIG. 4. The flow may be a new flow or an existing flow. When the flow is an existing flow, the flow has representation in the input queue (i.e., other cells from this flow have been admitted into the input queue). In one embodiment, a flow occupancy level is maintained for each flow profile.

At processing block 510, a determination is made to determine if the flow occupancy level is below the flow minimum threshold. The flow occupancy level is below the flow minimum threshold when the flow is a new flow, or when there is only a minimal number of cells from the flow that have been admitted. In either case, the cell is admitted, as shown in processing block 535. The process ends at processing block 545.

However, when the flow occupancy level is more than the flow minimum threshold, the process moves to processing block 515 where a drop probability based on per-class thresholds is applied. At block 520, a determination is made to see if the cell is to be admitted after applying the drop probability based on the per-class thresholds. When the cell is not to be admitted, the process moves to processing block 540 and the cell is rejected. However, when the cell is to be admitted after applying the drop probability based on the per-class thresholds, the process moves to processing block 525.

At the processing block 525, a drop probability based on per-flow thresholds is applied. At block 530, a determination is made to see if the cell is to be admitted after applying the drop probability based on the per-flow thresholds. When the cell is not to be admitted, the process moves from block 530 to processing block 540 where the cell is rejected. However, from block 530, if the cell is to be admitted, the process moves to processing block 535 where the cell is admitted. The process in FIG. 5 stops at block 545.

Although the packet dropping technique described above refers to cells arriving at an input queue, one skilled in the art would recognize that the technique may also be used in other environments (e.g., output queue) to provide fairness and to control queue overflow.

The method described above can be stored in the memory of a computer system as a set of instructions (i.e., software). The set of instructions may reside, completely or at least partially, within the main memory and/or within the processor to be executed. In addition, the set of instructions to perform the methods described above could alternatively be stored on other forms of machine-readable media. For the purposes of this specification, the term "machine-readable media" shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

Alternatively, the logic to perform the methods as discussed above, could be implemented in additional computer and/or machine readable media, such as, for example, discrete hardware components as large-scale integrated circuits (LSI's), application-specific integrated circuits (ASIC's), Field Programmable Gate Arrays (FPGA), firmware such as electrically erasable programmable read-only memory (EEPROM's), and electrical, optical, acoustical and other forms of propagated signals (e.g., carrier waves, infrared signals, digital signals, etc.), etc.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A computer implemented method, comprising:
admitting an arriving cell of a first flow into an ingress buffer of a network element when a flow occupancy level associated with the first flow in the ingress buffer is less than a flow minimum threshold associated with the first flow, the ingress buffer storing a plurality of classes of network traffic, each class having a plurality of flows, and each class having specific per-class thresholds and each flow having specific per-flow thresholds, wherein at least one per-flow threshold is different than at least one per-class threshold;
when the flow occupancy level is not less than the flow minimum threshold, applying a drop probability based on per-class thresholds to determine whether the arriving cell should be dropped, wherein a drop probability of the arriving cell is determined based on per-class thresholds corresponding to a class associated with the first flow;
when the arriving cell is not rejected after applying the drop probability based on the per-class thresholds, applying a drop probability based on per-flow thresholds associated with the first flow to determined whether the arriving cell should be dropped;
admitting the arriving cell if the arriving cell is not dropped based on the drop probability based on the per-flow thresholds; and wherein applying the drop probability based on per-flow thresholds is performed when the arriving cell is not rejected and is not admitted using the drop probability based on the per-class thresholds.

2. The method of claim 1, wherein applying the drop probability based on the per-class thresholds comprises using an average class occupancy level maintained in a class profile of a class associated with the drop probability based on the per-class thresholds.

3. The method of claim 2, wherein the per-class thresholds comprises a class minimum threshold and a class maximum threshold maintained in the corresponding class profile.

4. The method of claim 3, further comprising dropping the arriving cell when the average class occupancy level exceeds the class maximum threshold and admitting the arriving cell if the average class occupancy level is below the class minimum threshold.

5. The method of claim 4, wherein the flow occupancy level is an average flow occupancy level maintained in a flow profile associated with the first flow.

6. The method of claim 5, wherein the per-flow thresholds comprises a flow minimum threshold and a flow maximum threshold maintained in the corresponding flow profile.

7. The method of claim 6, further comprising:
dropping the arriving cell when the average flow occupancy level exceeds the flow maximum threshold; and
admitting the arriving cell when the average flow occupancy level is below the flow maximum threshold and the arriving cell is not dropped after applying the drop probability based on the per-class thresholds.

8. A computer readable medium having stored thereon sequences of instructions which are executable by a system, and which, when executed by the system, cause the system to:
admit an arriving cell of a first flow into an ingress buffer of a network element when a flow occupancy level associated with the first flow in the ingress buffer is less than a flow minimum threshold associated with the first flow, the ingress buffer storing a plurality of classes of network traffic, each class having a plurality of flows, and each class having specific per-class thresholds and each flow having specific per-flow thresholds, wherein at least one per-flow threshold is different than at least one per-class threshold;
when the flow occupancy level is not less than the flow minimum threshold, apply a drop probability based on per-class thresholds to determine whether the arriving cell should be dropped, wherein a drop probability of the arriving cell is determined based on per-class thresholds corresponding to a class associated with the first flow;
when the arriving cell is not rejected after applying the drop probability based on the per-class thresholds, apply a drop probability based on per-flow thresholds associated with the first flow to determine whether the arriving cell should be dropped;
admitting the arriving cell if the arriving cell is not dropped based on the drop probability based on the per-flow thresholds; and wherein applying the drop probability based on per-flow thresholds is performed when the arriving cell is not rejected and is not admitted using the drop probability based on the per-class thresholds.

9. The computer readable medium of claim 8, wherein applying the drop probability based on the per-class thresholds comprises using an average class occupancy level maintained in a class profile of a class associated with the drop probability based on the per-class thresholds.

10. The computer readable medium of claim 9, wherein the per-class thresholds comprises a class minimum threshold and a class maximum threshold maintained in the corresponding class profile.

11. The computer readable medium of claim 10, further comprising dropping the arriving cell when the average class occupancy level exceeds the class maximum threshold and admitting the arriving cell if the average class occupancy level is below the class minimum threshold.

12. The computer readable medium of claim 11, wherein the flow occupancy level is an average flow occupancy level maintained in a flow profile associated with the first flow.

13. The computer readable medium of claim 12, wherein the per-flow thresholds comprises a flow minimum threshold and a flow maximum threshold maintained in the corresponding flow profile.

14. The computer readable medium of claim 13, further comprising:
dropping the arriving cell when the average flow occupancy level exceeds the flow maximum threshold; and
admitting the arriving cell when the average flow occupancy level is below the flow maximum threshold and the arriving cell is not rejected after applying the drop probability based on the per-class thresholds.

15. A system, comprising a router that stores a logic when executed, performs the steps of:
admitting an arriving cell of a first flow into an ingress buffer of a network element when a flow occupancy level associated with the first flow in the ingress buffer is less than a flow minimum threshold associated with the first flow, the ingress buffer storing a plurality of classes of network traffic, each class having a plurality of flows, and each class having specific per-class thresholds and each flow having specific per-flow thresholds, wherein at least one per-flow threshold is different than at least one per-class threshold;

when the flow occupancy level is not less than the flow minimum threshold, applying a drop probability based on per-class thresholds to determine whether the arriving cell should be dropped, wherein a drop probability of the arriving cell is determined based on per-class thresholds corresponding to a class associated with the first flow;

when the arriving cell is not rejected after applying the drop probability based on the per-class thresholds, applying a drop probability based on per-flow thresholds to determine whether the arriving cell should be dropped;

admitting the arriving cell if the arriving cell is not dropped based on the drop probability based on the per-flow thresholds; and wherein applying the drop probability based on per-flow thresholds is performed when the arriving cell is not rejected and is not admitted using the drop probability based on the per-class thresholds.

16. The system of claim 15, wherein the drop probability based on the per-class thresholds is applied using an average class occupancy level maintained in a class profile of a class associated with the drop probability based on the per-class thresholds.

17. The system of claim 16, wherein the per-class thresholds comprises a class minimum threshold and a class maximum threshold maintained in the corresponding class profile.

18. The system of claim 17, wherein the arriving cell is dropped when the average class occupancy level exceeds the class maximum threshold, wherein the arriving cell is admitted if the average class occupancy level is below the class minimum threshold.

19. The system of claim 18, wherein the flow occupancy level is an average flow occupancy level maintained in a flow profile associated with the first flow.

20. The system of claim 19, wherein the per-flow thresholds comprises a flow minimum threshold and a flow maximum threshold maintained in the corresponding flow profile.

21. The system of claim 20, wherein the arriving cell is rejected when the average flow occupancy level exceeds the flow maximum threshold, and wherein the arriving cell is admitted when the average flow occupancy level is below the.

* * * * *